United States Patent
Hirai et al.

(10) Patent No.: US 9,630,536 B2
(45) Date of Patent: Apr. 25, 2017

(54) VEHICLE SEAT

(71) Applicant: TOYOTA BOSHOKU KABUSHIKI KAISHA, Aichi-ken (JP)

(72) Inventors: Shinji Hirai, Toyota (JP); Shinsuke Yamano, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/692,065

(22) Filed: Apr. 21, 2015

(65) Prior Publication Data
US 2015/0306993 A1   Oct. 29, 2015

(30) Foreign Application Priority Data

Apr. 25, 2014  (JP) ................................ 2014-091059

(51) Int. Cl.
*A47C 1/10*     (2006.01)
*B60N 2/48*     (2006.01)

(52) U.S. Cl.
CPC ........ *B60N 2/48* (2013.01); *B60N 2002/4897* (2013.01)

(58) Field of Classification Search
CPC ....................... B60N 2/48; B60N 2002/4897
USPC ............................ 297/391, 410, 463.1, 463.2
See application file for complete search history.

(56) References Cited

U.S. PATENT DOCUMENTS

| | | | | |
|---|---|---|---|---|
| 4,639,041 A * | 1/1987 | Furukawa | ............ | B60N 2/4826 297/391 |
| 5,927,813 A * | 7/1999 | Nemoto | ............... | B60N 2/4808 297/391 |
| 6,454,356 B1 * | 9/2002 | Yamada | ............... | B60N 2/4814 297/391 |
| 7,255,401 B2 * | 8/2007 | Yokoyama | ........... | B60N 2/4817 297/410 |
| 8,967,721 B2 * | 3/2015 | Muto | ................... | B60N 2/4823 297/410 |
| 9,187,017 B2 * | 11/2015 | Ronzi | ................... | B60N 2/4811 |
| 2005/0200185 A1 * | 9/2005 | Yokoyama | ........... | B60N 2/4817 297/410 |

(Continued)

FOREIGN PATENT DOCUMENTS

| | | | | |
|---|---|---|---|---|
| CA | 2455232 A1 * | 2/2003 | ........... | B60N 2/4808 |
| DE | 10151360 A1 * | 4/2003 | ............. | B60N 2/482 |

(Continued)

*Primary Examiner* — Laurie K Cranmer
(74) *Attorney, Agent, or Firm* — Greenblum & Bernstein, P.L.C.

(57) ABSTRACT

A vehicle seat includes a seatback, a support installed on the seatback, and a headrest having a stay inserted into the support. The support has a flanged head disposed outside the seatback and into which the stay is inserted, and a body disposed inside the seatback, and when the support is installed on the seatback, the head of the support depresses the seatback. The head has an overhang part, and a narrowed part that is provided between the overhang part and the body and that is narrower than the overhang part. A degree of narrowing of the narrowed part is set in such a way that, when the narrowed part of the head of the support depresses the seatback with the support installed on the seatback, the overhang part is in contact with a depressed surface of the seatback.

2 Claims, 11 Drawing Sheets

(56) References Cited

U.S. PATENT DOCUMENTS

| | | | | |
|---|---|---|---|---|
| 2007/0145804 A1* | 6/2007 | Ichisugi | ............... | B60N 2/4817 |
| | | | | 297/410 |
| 2009/0236894 A1* | 9/2009 | Liu | ..................... | B60N 2/4814 |
| | | | | 297/410 |
| 2010/0156152 A1* | 6/2010 | Chen | ................... | B60N 2/4808 |
| | | | | 297/112 |

FOREIGN PATENT DOCUMENTS

| | | | | |
|---|---|---|---|---|
| FR | EP 1826059 A1 * | 8/2007 | ........... | B60N 2/4826 |
| FR | 2912353 A1 * | 8/2008 | ........... | B60N 2/4808 |
| FR | 2912702 A1 * | 8/2008 | ........... | B60N 2/4817 |
| JP | WO 0010430 A1 * | 3/2000 | ........... | B60N 2/4814 |
| JP | 2006-198226 | 8/2006 | | |

\* cited by examiner

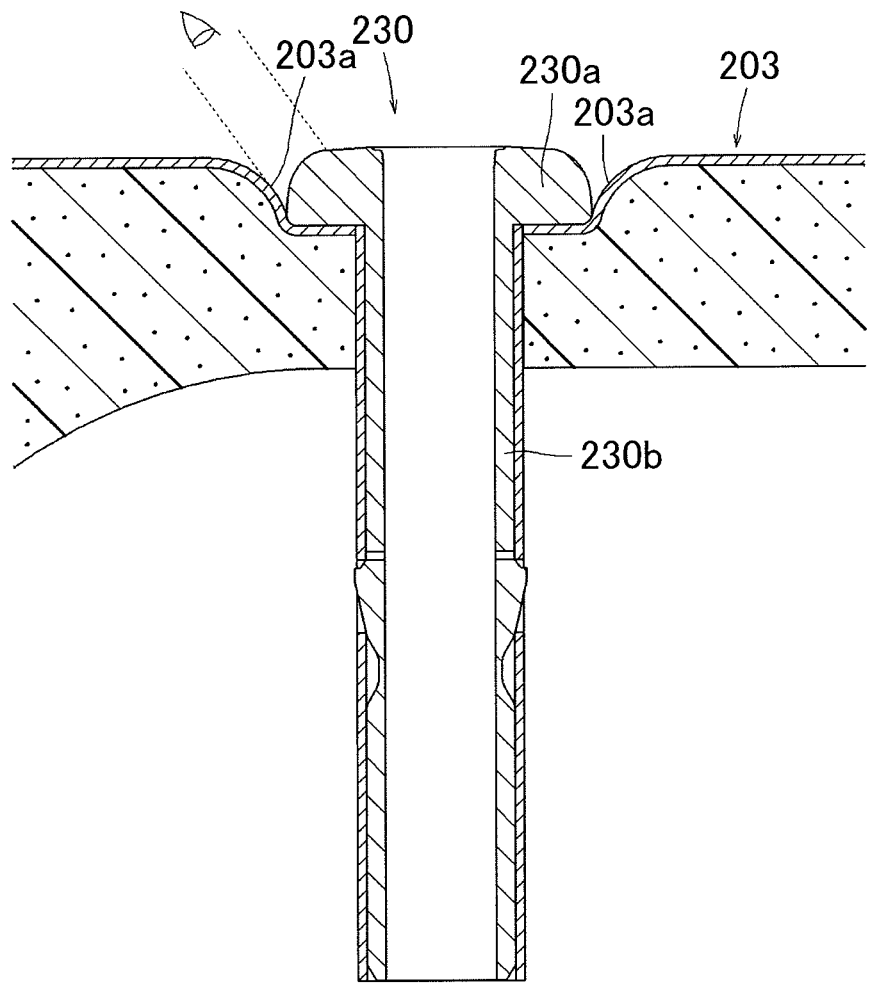

VEHICLE SEAT

INCORPORATION BY REFERENCE

The disclosure of Japanese Patent Application No. 2014-091059 filed on Apr. 25, 2014 including the specification, drawings and abstract is incorporated herein by reference in its entirety.

BACKGROUND OF THE INVENTION

1. Field of the Invention

The present invention relates to a vehicle seat and more particularly to a vehicle seat on which the support for installing the headrest is provided in the seatback.

2. Description of Related Art

Conventionally, the headrest of a vehicle seat is installed on the seatback by inserting the support into the support hole of the holder provided in the seatback and then by inserting the stay of the headrest into the stay hole provided on the inserted support. For example, as shown in FIG. 9, a support 230 has a flanged head 230a disposed outside the seatback and into which the stay of the headrest is inserted, and a body 230b disposed inside the seatback. Such a support is described in Japanese Patent Application Publication No. 2006-198226 (JP 2006-198226 A). When the support 230 is installed on a seatback 203, the head 230a of the support 230 depresses the seatback 203 (see FIGS. 10 to 11). This configuration reduces the amount of projection of the head 230a from the top surface of the seatback 203, improving the appearance of the vehicle seat.

However, in the related art described above, the depression amount of the seatback 203 is increased to improve the appearance of the vehicle seat. For this reason, the inclination angle of a depressed surface 203a (inclined surface) of the seatback 203 becomes large and, as a result, wrinkles are generated. The wrinkles, which are generated in this manner, degrade the appearance of the vehicle seat.

SUMMARY OF THE INVENTION

The present invention provides a vehicle seat that prevents the generation of wrinkles on the depressed surface of the seatback while reducing the amount of projection of the head of the support from the top surface of the seat back by depressing the seatback.

One aspect of the present invention relates to a vehicle seat including a seatback, a support installed on the seatback, and a headrest having a stay inserted into the support. The support has a flanged head disposed outside the seatback and into which the stay is inserted, and a body disposed inside the seatback, and when the support is installed on the seatback, the head of the support depresses the seatback. The head has an overhang part, and a narrowed part that is provided between the overhang part and the body and that is narrower than the overhang part. A degree of narrowing of the narrowed part is set in such a way that, when the narrowed part of the head of the support depresses the seatback with the support installed on the seatback, the overhang part is in contact with a depressed surface of the seatback.

According to this configuration, when the head of the installed support depresses the seatback with the support installed on the seatback, the overhang part pushes the depressed surface of the depressed seatback. Therefore, this configuration decreases the inclination angle of the depressed surface, preventing wrinkles from being generated on the depressed surface.

The narrowed part may be a recess part, or an inclined part having a shape that tapers toward the body from the overhang part. In a case where the narrowed part is the recess part, when the head of the installed support depresses the seatback with the support installed on the seatback, the overhang part is in line contact with the depressed surface of the seatback. This configuration causes the pressure of the head on the depressed surface to be concentrated. Therefore, a high pressure is applied to the back cover on the surface of the seatback, allowing the seatback to be suitably covered with the back cover.

The narrowed part may be provided all around the periphery of the support. This configuration prevents wrinkles from being generated on the whole area on the depressed surface of the seatback.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 11 is a diagram showing the state after the support shown in FIG. 9 is installed in the holder.

DETAILED DESCRIPTION OF EMBODIMENTS

Embodiments of the present invention are described below with reference to the drawings. First, a first embodiment of the present invention is described with reference to FIG. 1 to FIG. 5. In the description below, a "vehicle seat 1 installed in an automobile" is described as an example of a "vehicle seat." Similarly, a "recess part 30c" is described as an example of a "narrowed part."

In the description below, the terms "up, down, forward, backward, right, and left" below indicate the up, down, forward, backward, right, and left directions shown in the figure described above, that is, the up, down, forward, backward, right, and left directions when the vehicle seat 1 is installed in the automobile (not shown). These terms are used in the same meanings in the second embodiment that will be described later.

Figure 1:
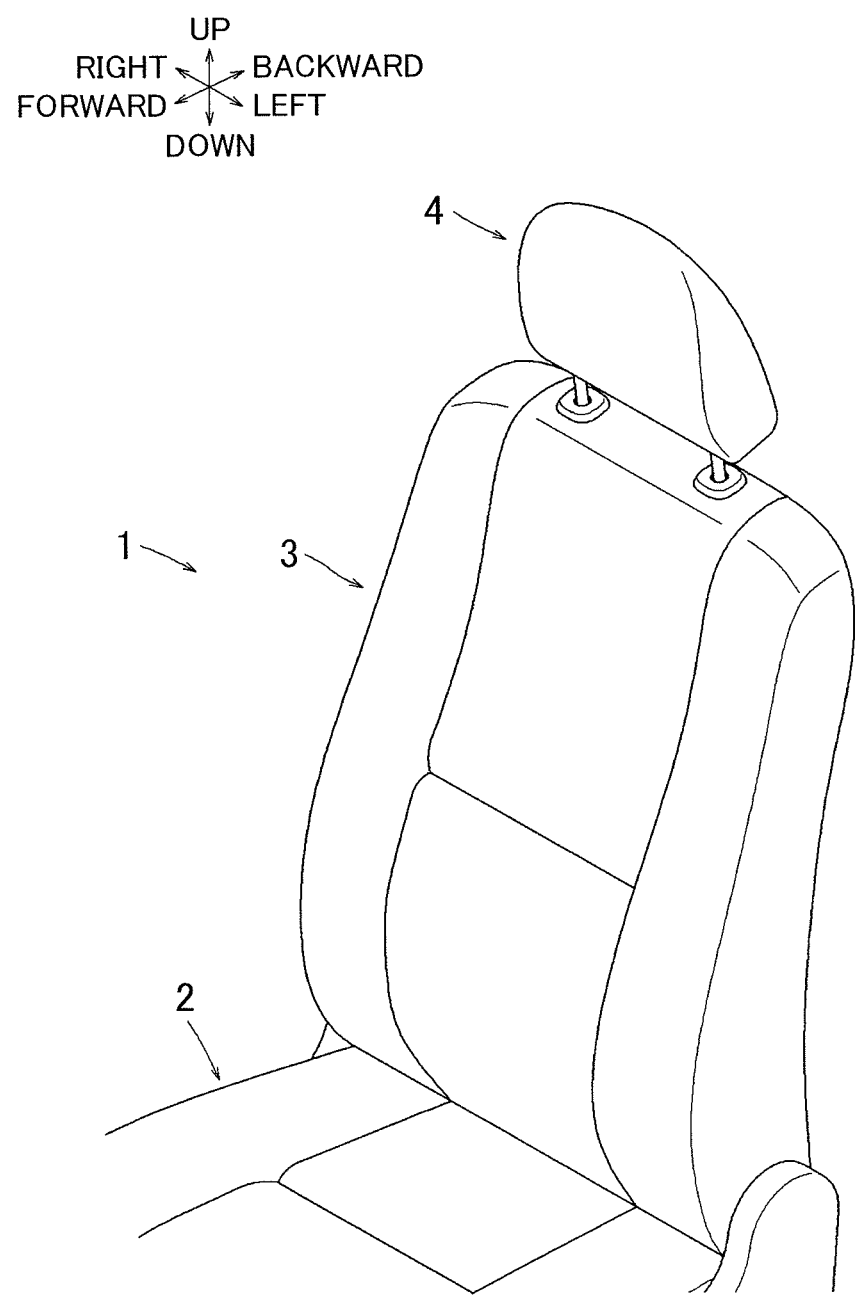
FIG. 1 is a general perspective view showing a vehicle seat in a first embodiment of the present invention.
Figure 2:
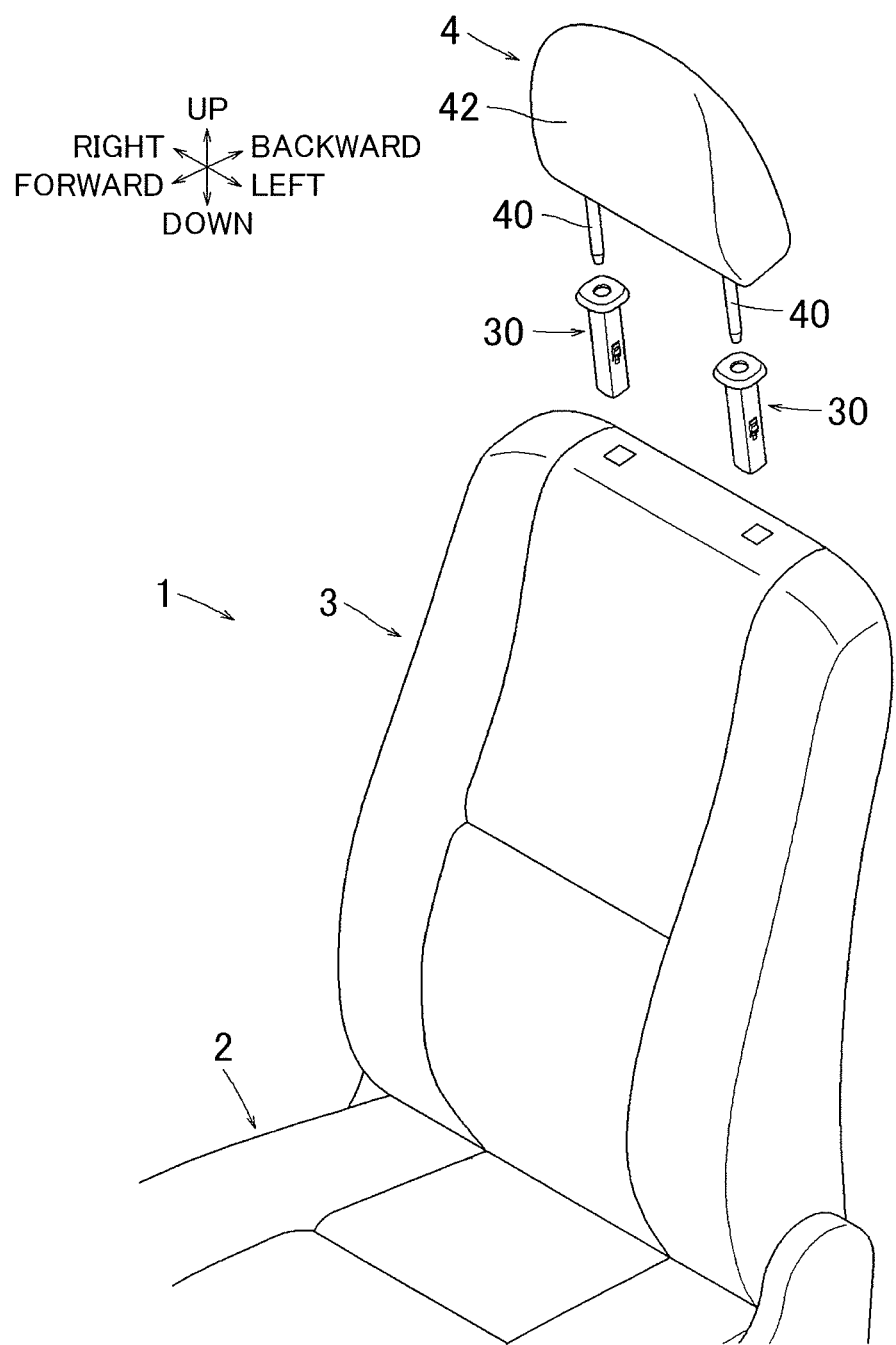
FIG. 2 is an exploded view showing the main part in FIG. 1.

The general configuration of the vehicle seat 1 in the first embodiment of the present invention is described below with reference to FIGS. 1 to 2. The vehicle seat 1, for example, a driver's seat, mainly includes a seat cushion 2, a seatback 3 installed on the seat cushion 2, and a headrest 4 installed on the seatback 3.

The detail of the seatback 3 is described below. The seat cushion 2 may be a known seat cushion and, therefore, its detailed description is omitted. The headrest 4 may be a known headrest constituted by a pair of right and left stays 40 and a headrest body 42 formed of a cushion body firmly fixed to the stays 40, and, therefore, its detailed description is omitted.

The seatback 3 includes a back frame (not shown), a back pad 12 that wraps the back frame 10, and a back cover 14 that covers the surface of the back pad 12. The back frame 10 in the form of a generally rectangular frame is configured by a left side frame, a right side frame, an upper frame, and a lower panel (none shown).

On the upper frame, a pair of right and left holders 20 is provided. Each of these holders has a support hole 22 into which a support 30 that will be described later can be inserted. On the right and left walls of each of the holders 20, engaging holes 24, which can engage with engaging projections 34 that will be described later, are formed.

Figure 3:
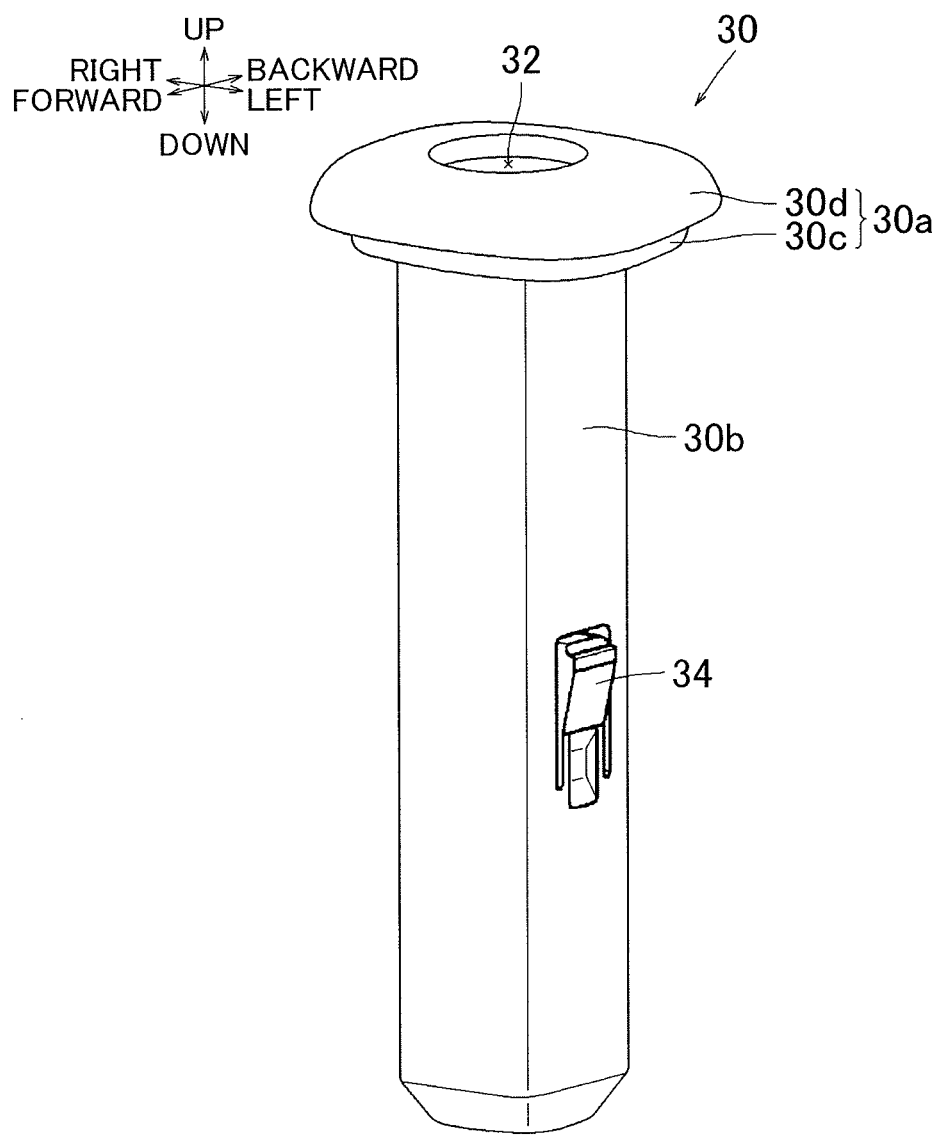
FIG. 3 is an enlarged view showing the support in FIG. 2.
Figure 4:
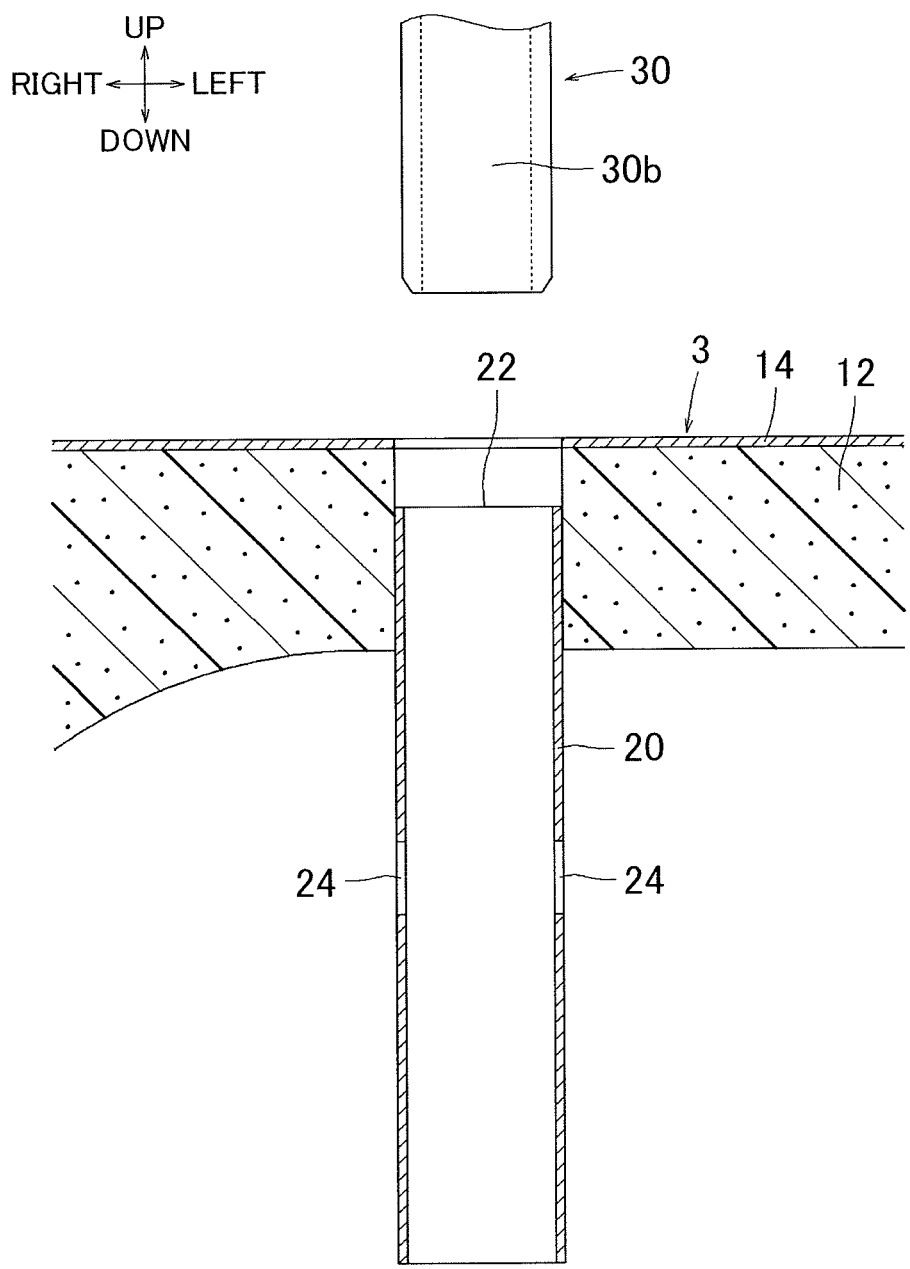
FIG. 4 is a diagram showing the state before the support shown in FIG. 3 is installed in the holder.

The support 30 is described in detail below with reference to FIG. 3. The support 30 has a stay hole 32 into which the stay 40 of the headrest 4 can be inserted. In addition, the support 30 has a flanged head 30a and a body 30b. The support 30, a single piece of generally rectangular-cylindrical in shape, is formed of stiff synthetic resin. The head 30a is a part into which the stay 40 of the headrest 4 is inserted. That is, the stay 40 is inserted into the stay hole 32 in the direction from the head 30a toward body 30b. The head 30a is a part to be disposed outside the seatback 3 (holder 20) and not inserted into the seatback 3 (holder 20). The head 30a (having a recess part 30c and an overhang part 30d that will be described later) is larger than the support hole 22 of the holder 20. That is, cross-section size of the head 30a in the direction orthogonal to the longitudinal direction of the support 30 is larger than that of the support hole 22 of the holder 20.

The head 30a has the recess part 30c provided on the side nearer to the body 30b (lower side) and the overhang part 30d provided on the base end side (opposite side of the body 30b). The recess part 30c, with the cross section size in the orthogonal direction smaller than that of the overhang part 30d, is formed all around the periphery of the support 30. That is, the head 30a has the overhang part 30d, and the recess part 30c that is provided between the overhang part 30d and the body 30b and that is narrower than the overhang part 30d. The overhang part 30d projects from the recess part 30c in the direction orthogonal to the support 30.

The degree of recess of the recess part 30c (in other words, the size of the recess part 30c and so on) is set in such a way that, when the recess part 30c of the head 30a of the support 30 depresses the seatback 3 with the support 30 installed on the seatback 3 (holder 20) as will be described later, the overhang part 30d of the head 30a of the support 30 is in contact with a depressed surface 3a of the seatback 3.

On the other hand, the body 30b is a part to be disposed inside the seatback 3 (holder 20) and inserted into the seatback 3 (holder 20). On each of the right and left walls of the body 30b, the engaging projection 34, which can engage with the corresponding engaging hole 24 on the holder 20, is formed.

Next, the following describes the operation for installing the headrest 4 on the seatback 3 described above with reference to FIGS. 1 to 2 and FIGS. 4 to 5. In describing this operation, because the installation operation is done in the same way in both right and left sides, the installation on only one side is described below and the description of the installation on the other side is omitted. First, the support 30 is inserted into the support hole 22 of the holder 20 in the state shown in FIG. 2 and FIG. 4. Then, both engaging projections 34 of the support 30 engage with both engaging holes 24 of the holder 20. After they are engaged, the installation of the support 30 on the seatback 3 (holder 20) is completed (see FIG. 5).

Figure 5:
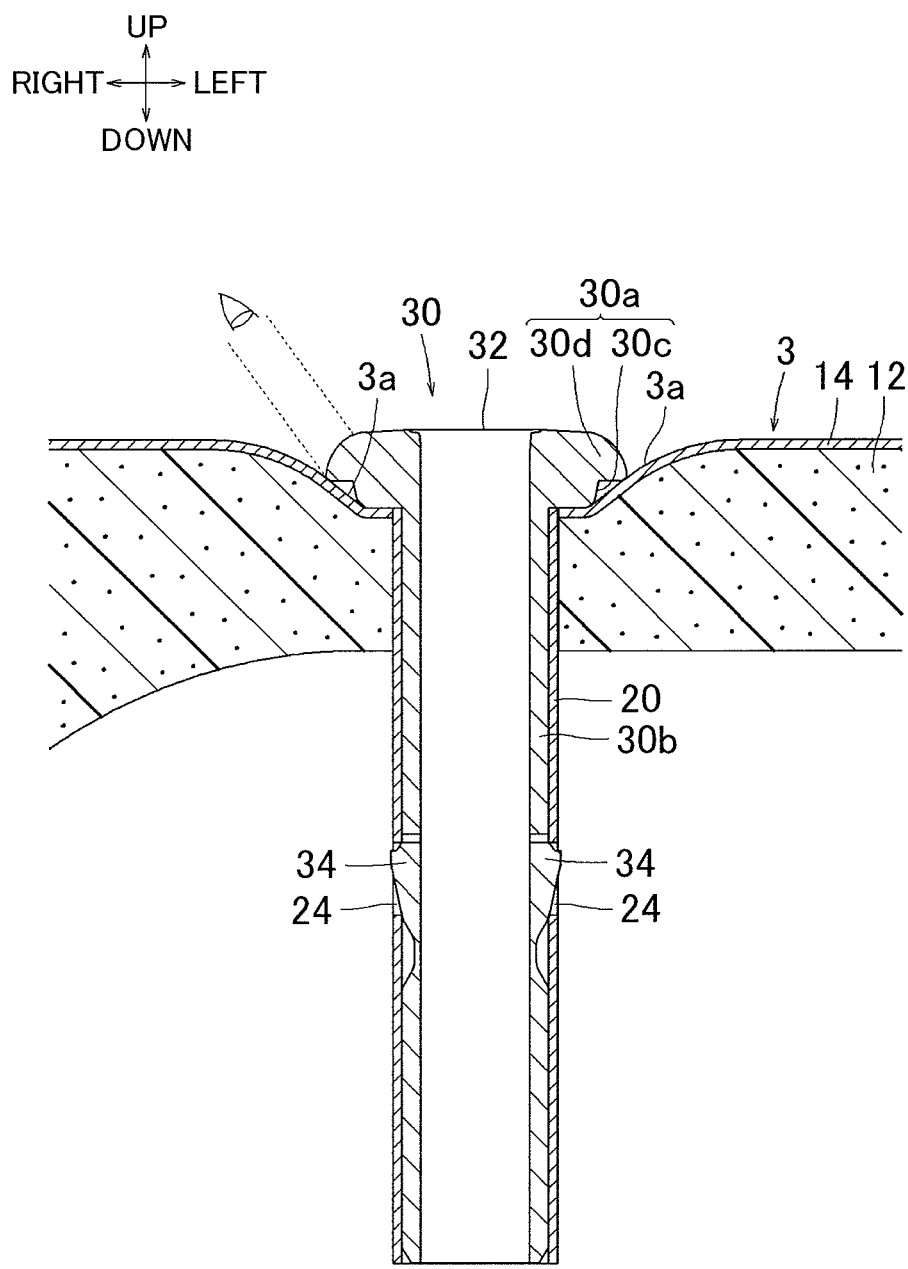
FIG. 5 is a diagram showing the state after the support shown in FIG. 3 is installed in the holder.

In the state in which the support 30 is installed as described above, the recess part 30c of the head 30a of the support 30 depresses the seatback 3. Therefore, as in the related art, this configuration can reduce the amount of projection of the head 30a from the top surface of the seatback 3, improving the appearance of the vehicle seat 1. At this time, as shown in FIG. 5, the overhang part 30d of the head 30a of the support 30 is in contact with the depressed surface 3a of the seatback 3.

Next, the stay 40 of the headrest 4 is inserted into the stay hole 32 of the support 30. After this operation is done, the lock portion (not shown) of the support 30 engages with the groove (not shown) of the stay 40. After they are engaged, the installation of the stay 40 of the headrest 4 into the support 30 is completed. In this manner, the installation of the headrest 4 on the seatback 3 is completed (see FIG. 1). The lock portion is engaged in a known mode and therefore the detailed description is omitted.

The vehicle seat 1 in the first embodiment of the present invention is configured as described above. According to this configuration, the head 30a of the support 30 has a recess part 30c that is provided on the side nearer to the body 30b (lower side) and has the orthogonal-direction cross section size smaller than that of the overhang part 30d. The degree of recess of the recess part 30c is set in such a way that, when the recess part 30c of the head 30a of the support 30 depresses the seatback 3 with the support 30 installed on the seatback 3 (holder 20), the overhang part 30d of the head 30a of the support 30 is in contact with the depressed surface 3a of the seatback 3. As a result, when the head 30a of the installed support 30 depresses the seatback 3 with the support 30 installed on the seatback 3, the overhang part 30d pushes the depressed surface 3a of the seatback 3. Therefore, this configuration decreases the inclination angle of the depressed surface 3a, preventing wrinkles from being generated on the depressed surface 3a.

When the head 30a of the support 30 depresses the seatback 3 in this manner, the vehicle occupants can see, not all the head 30a, but only the overhang part 30d, of the support 30. That is, the vehicle occupants cannot see the recess part 30c that is a part of the head 30a of the support 30. In contrast, in the related art (see FIG. 11), the vehicle occupants can see all the head 230a of the support 230. Therefore, as compared with the related art, the head 30a of the support 30 appears thinner.

In addition, according to this configuration, the recess part 30c functions as a narrowed part. Therefore, when the head 30a of the support 30 depresses the seatback 3 with the support 30 installed on the seatback 3, the overhang part 30d is in a line contact with the depressed surface 3a of the seatback 3. As a result, this configuration causes the pressure of the head 30a on the depressed surface 3a to be concentrated. This means that a high pressure is applied to the back cover 14 on the surface of the seatback 3 in this manner, allowing the seatback 3 to be suitably covered with the back cover 14 (the back cover 14 tightly covers the seatback 3).

According to this configuration, the recess part 30*c* is formed all around the periphery of the support 30. Therefore, this configuration prevents wrinkles from being generated on the whole area on the depressed surface 3*a* of the seatback 3.

Figure 7:
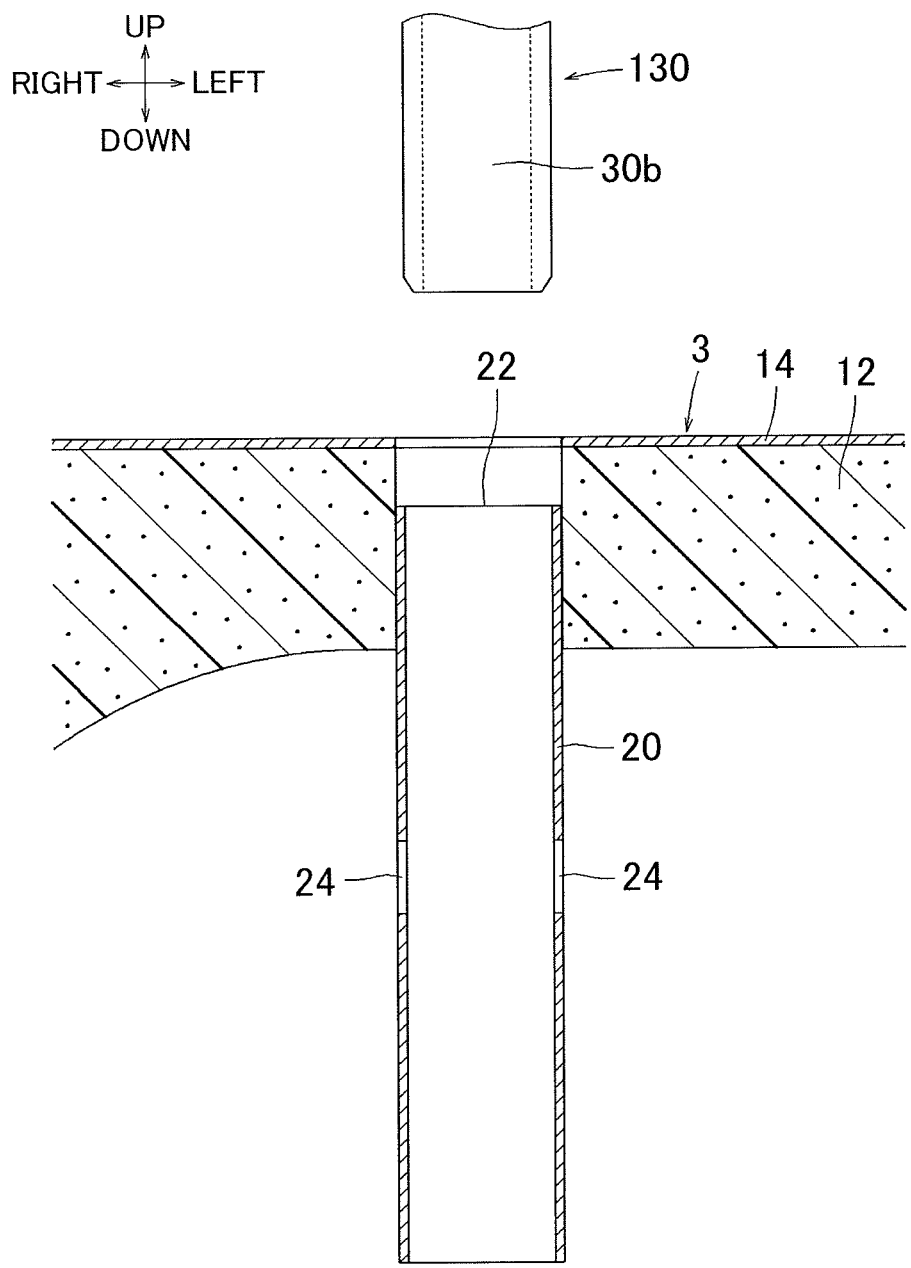
FIG. 7 is a diagram showing the state before the support shown in FIG. 6 is installed in the holder.
Figure 8:
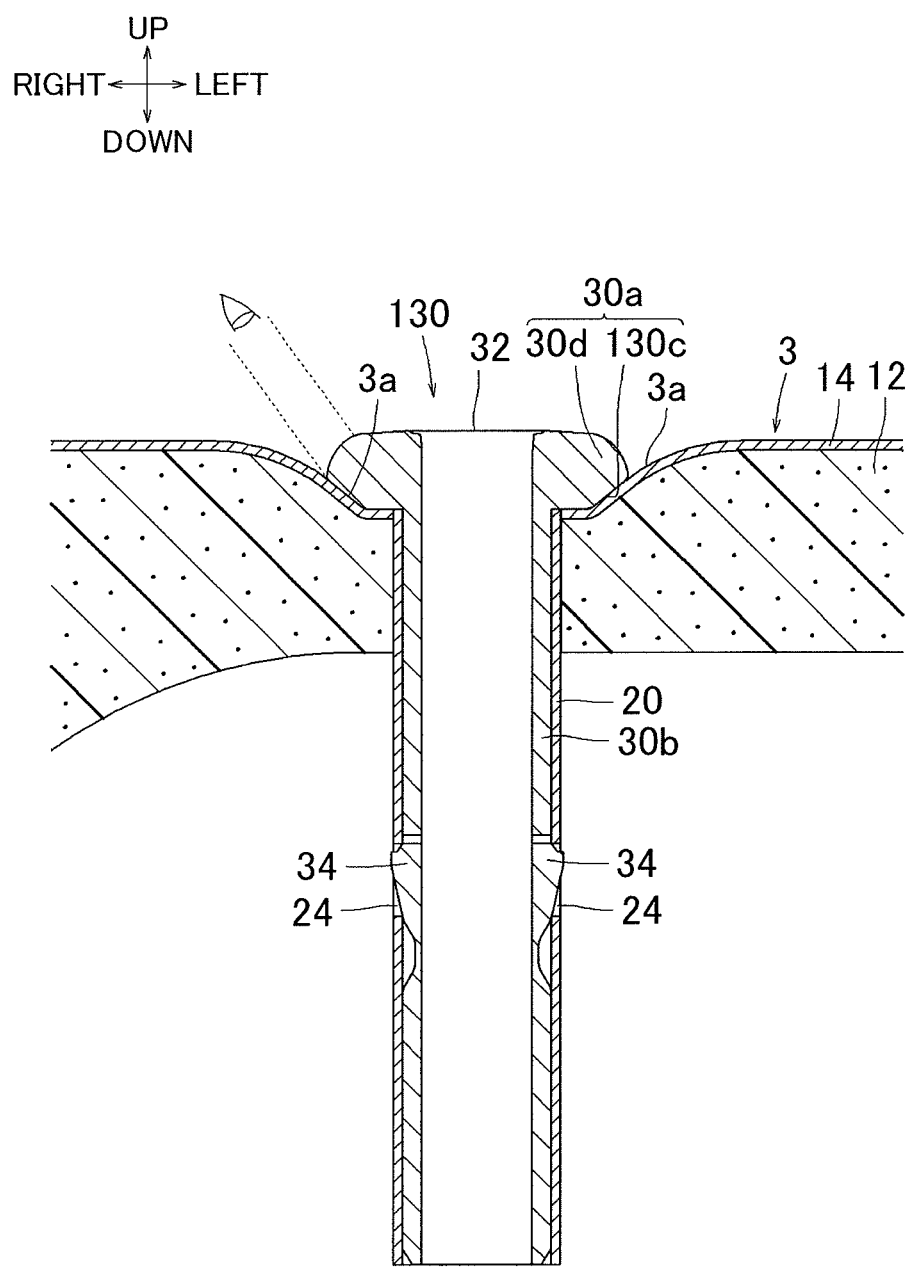
FIG. 8 is a diagram showing the state after the support shown in FIG. 6 is installed in the holder.
Figure 9:
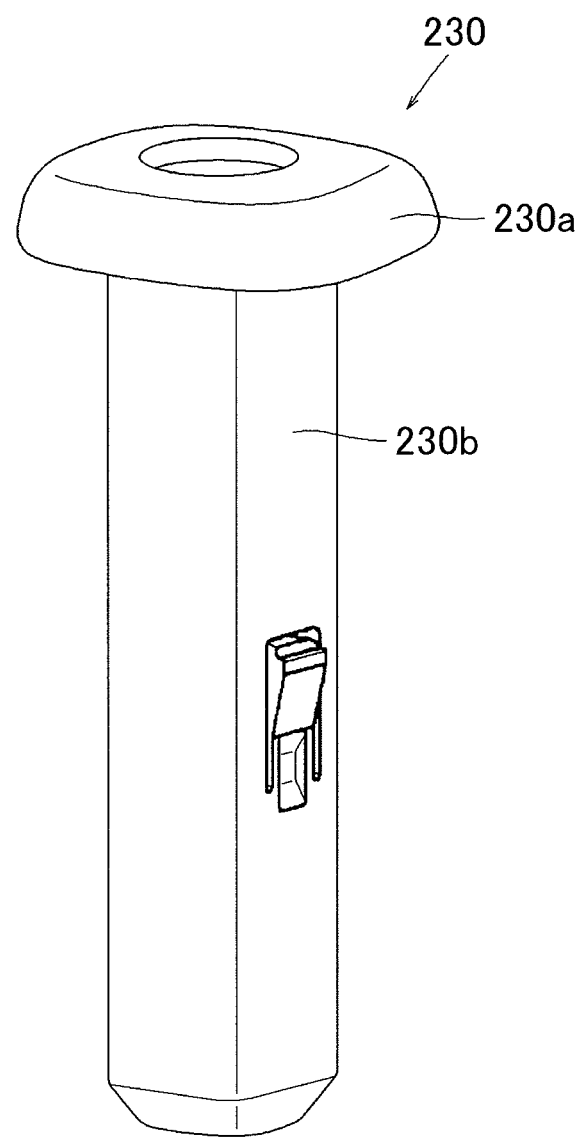
FIG. 9 is an enlarged view of a support in the related art.
Figure 10:
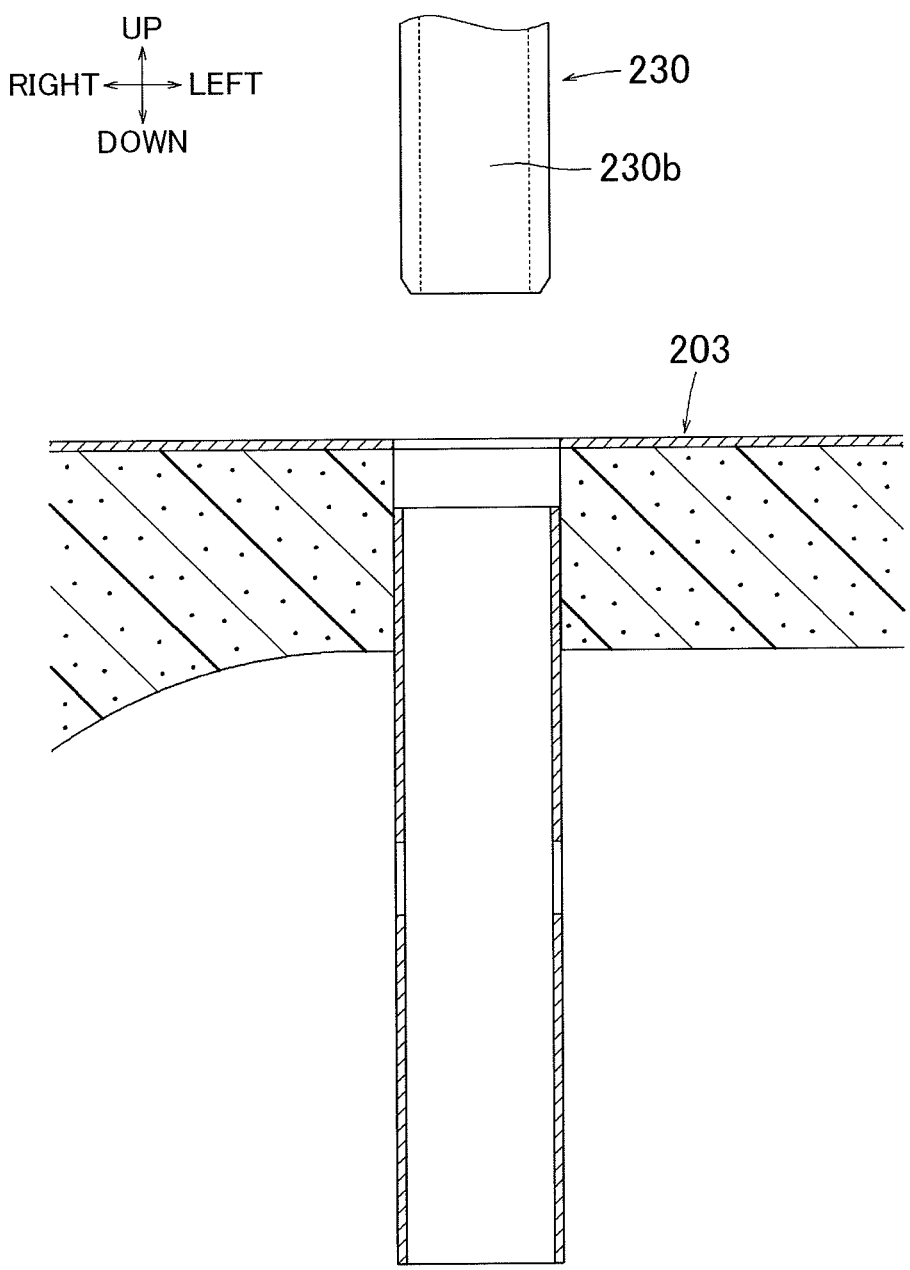
FIG. 10 is a diagram showing the state before the support shown in FIG. 9 is installed in the holder.

Next, a second embodiment of the present invention is described with reference to FIGS. 6 to 8. The second embodiment is different from the first embodiment described above in that the "narrowed part" is not the "recess part 30*c*" but an "inclined part 130*c*." In the description below, the same reference numeral is given to the same configuration or the same member in the drawings as that in the first embodiment, and the repetitive description will be omitted.

Figure 6:
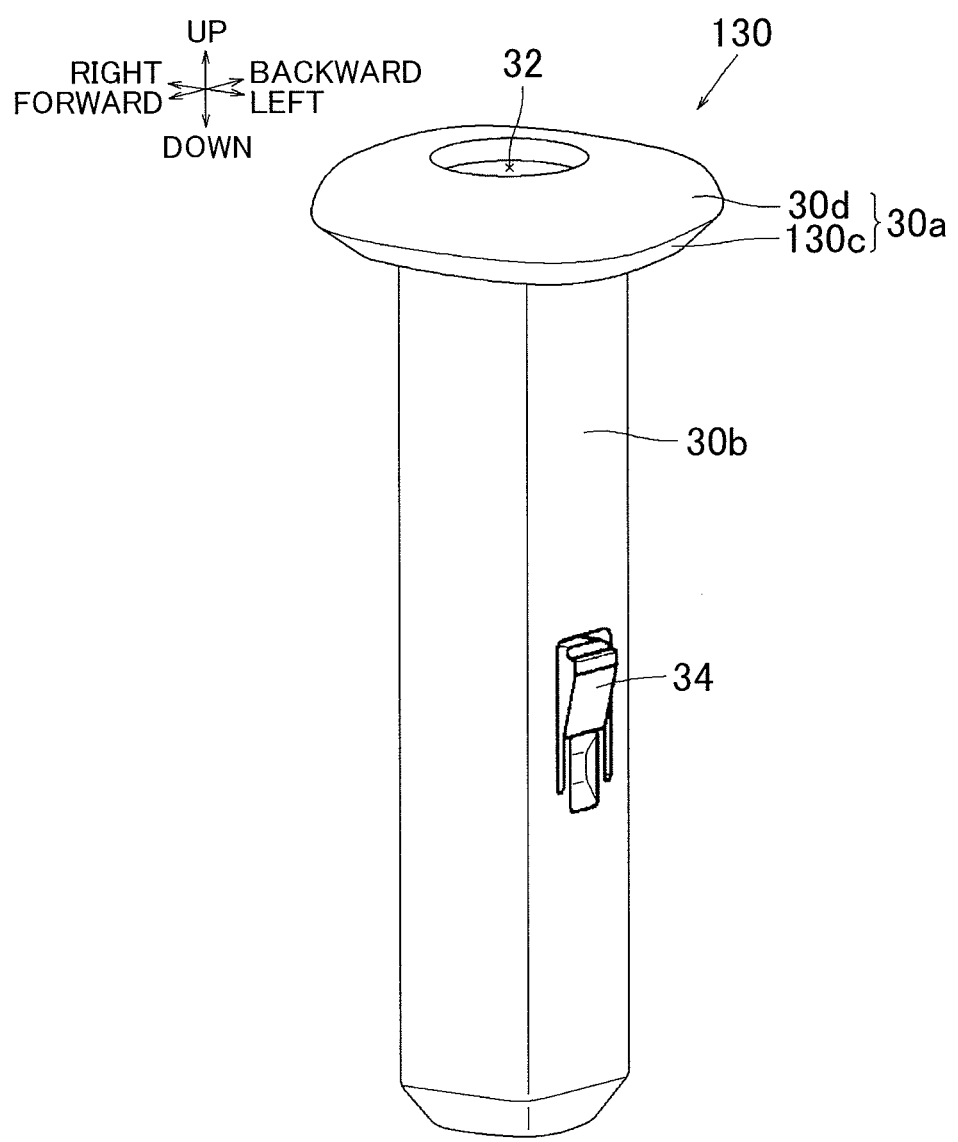
FIG. 6 is an enlarged view showing a support in a second embodiment of the present invention.

As shown in FIG. 6, the head 30*a* of a support 130 has an inclined part 130*c*, which is provided on the side nearer to the body 30*b* (lower side), and the overhang part 30*d*. The inclined part 130*c* is formed in a shape that tapers toward the body 30*b* from the overhang part 30*d*. As with the degree of recess of the recess part 30*c* described in the first embodiment, the degree of inclination of the inclined part 130*c* is set in such a way that, when the inclined part 130*c* of the head 30*a* of the support 30 depresses the seatback 3 with the support 30 installed on the seatback 3 (holder 20), the overhang part 30*d* of the head 30*a* of the support 30 is in contact with the depressed surface 3*a* of the seatback 3.

The vehicle seat (not shown) in the second embodiment of the present invention is configured as described above. This configuration archives the effect similar to that of the vehicle seat 1 in the first embodiment. That is, when the head 30*a* of the installed support 130 depresses the seatback 3 with the support 130 installed on the seatback 3, the overhang part 30*d* pushes the depressed surface 3*a* of the seatback 3. Therefore, this configuration decreases the inclination angle of the depressed surface 3*a*, preventing wrinkles from being generated on the depressed surface 3*a*. This configuration also makes the head 30*a* of the support 130 appear thinner. In addition, this configuration prevents wrinkles from being generated on the whole area on the depressed surface 3*a* of the seatback 3.

While one embodiment of the present invention has been described, it does not mean that the present invention is limited to the description above.

In the embodiments described above, the "vehicle seat 1" installed in the automobile is described as an example of a "vehicle seat." However, note that the present invention is not limited to an automobile seat but may be applied to a seat for various types of vehicles, such as a "ship seat", an "aircraft seat", and "railway vehicle seat."

What is claimed is:

1. A vehicle seat comprising a seatback, a support installed on the seatback, and a headrest having a stay inserted into the support, wherein
    the support has a flanged head disposed outside the seatback and into which the stay is inserted, and a body disposed inside the seatback,
    when the support is installed on the seatback, the flanged head of the support depresses the seatback,
    the flanged head has an overhang part and a narrowed part that is provided between the overhang part and the body and that is narrower than the overhang part,
    a degree of narrowing of the narrowed part is set in such a way that, when the narrowed part of the flanged head of the support depresses the seatback with the support installed on the seatback, the overhang part is in contact with a depressed surface of the seatback,
    the narrowed part includes a bottom face provided orthogonal to the body of the support and an inclined part provided between the bottom face and the overhang part, and
    the inclined part has a shape that continuously tapers from a circumferential edge of the overhang part to the bottom face.

2. The vehicle seat according to claim 1, wherein the narrowed part is provided all around a periphery of the support.

* * * * *